United States Patent
Okada (10) Patent No.: US 10,612,845 B2
(45) Date of Patent: Apr. 7, 2020

(54) LIQUID REMOVAL APPARATUS AND LIQUID REMOVAL METHOD

(71) Applicant: Kabushiki Kaisha Toshiba, Minato-ku (JP)

(72) Inventor: Naotada Okada, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 144 days.

(21) Appl. No.: 15/918,092

(22) Filed: Mar. 12, 2018

(65) Prior Publication Data

US 2018/0266764 A1 Sep. 20, 2018

(30) Foreign Application Priority Data

Mar. 17, 2017 (JP) ................................. 2017-053370

(51) Int. Cl.

| F26B 7/00 | (2006.01) |
|---|---|
| G02B 27/14 | (2006.01) |
| G02B 27/09 | (2006.01) |
| F26B 3/28 | (2006.01) |
| F26B 5/12 | (2006.01) |
| G02B 19/00 | (2006.01) |
| G02B 27/10 | (2006.01) |
| G02B 27/30 | (2006.01) |
| H01S 3/11 | (2006.01) |
| H01S 3/16 | (2006.01) |

(52) U.S. Cl.
CPC .................. *F26B 7/00* (2013.01); *F26B 3/28* (2013.01); *F26B 5/12* (2013.01); *G02B 19/0047* (2013.01); *G02B 27/0905* (2013.01); *G02B 27/0961* (2013.01); *G02B 27/0994* (2013.01); *G02B 27/10* (2013.01); *G02B 27/145* (2013.01); *G02B 27/30* (2013.01); *H01S 3/11* (2013.01); *H01S 3/1643* (2013.01)

(58) Field of Classification Search
CPC ...... F26B 7/00; F26B 5/12; F26B 3/28; F26B 23/00; F26B 3/00; G02B 27/10; G02B 27/30; G02B 19/0047; G02B 27/145; G02B 27/0994; G02B 27/0961; G02B 27/0905; H01S 3/1643; H01S 3/11
See application file for complete search history.

(56) References Cited

U.S. PATENT DOCUMENTS

2012/0189903 A1 7/2012 Kawada et al.

FOREIGN PATENT DOCUMENTS

| JP | 9-10968 A | 1/1997 |
|---|---|---|
| JP | 9-314371 A | 12/1997 |
| JP | 2003-47923 | 2/2003 |
| JP | 2003-303799 | 10/2003 |
| JP | 2004-255331 | 9/2004 |
| JP | 2009-32952 A | 2/2009 |
| JP | 2011-62650 A | 3/2011 |
| JP | 5940284 | 6/2016 |

*Primary Examiner* — Jessica Yuen
(74) *Attorney, Agent, or Firm* — Oblon, McClelland, Maier & Neustadt, L.L.P.

(57) ABSTRACT

A liquid removal apparatus is configured to remove a liquid by irradiating a laser beam on the liquid. The liquid is adhered to a surface of a member. The apparatus includes a laser light source, and an energy controller. The energy controller is configured to unevenly distribute an energy intensity at an irradiation surface by splitting, into a plurality of laser beams, a laser beam emitted from the laser light source and by overlaying a portion of the split plurality of laser beams at an irradiation position where the liquid is adhered.

20 Claims, 6 Drawing Sheets

LIQUID REMOVAL APPARATUS AND LIQUID REMOVAL METHOD

CROSS-REFERENCE TO RELATED APPLICATIONS

This application is based upon and claims the benefit of priority from Japanese Patent Application No. 2017-053370, filed on Mar. 17, 2017; the entire contents of which are incorporated herein by reference.

FIELD

Embodiments described herein relate generally to a liquid removal apparatus and liquid removal method.

BACKGROUND

Technology that evaporates a liquid adhered to a surface of a member has been proposed in which a laser beam is irradiated on the liquid. However, it is necessary to irradiate a laser beam having a large energy to completely evaporate the liquid. Also, a portion of the laser beam irradiated on the liquid reaches the surface of the member. Therefore, if the laser beam having the large energy is irradiated on the liquid, there is a risk that the surface of the member may be damaged by the laser beam reaching the surface of the member. In such a case, if the liquid is evaporated completely by irradiating a laser beam having a small energy on the liquid, the damage of the surface of the member can be reduced; but other problems occur in that the removal of the liquid is insufficient, and the operation time is long.

Also, if the liquid is evaporated completely, there is a risk that chemical reactions may occur between the components included in the liquid and the components included in the member or the surrounding environment; the surface of the member may become unclean; or the surface of the member may be corroded.

Therefore, it is desirable to develop technology in which the effects on the surface of the member can be suppressed when removing the liquid.

DETAILED DESCRIPTION

According to one embodiment, a liquid removal apparatus is configured to remove a liquid by irradiating a laser beam on the liquid. The liquid is adhered to a surface of a member. The apparatus includes a laser light source, and an energy controller. The energy controller is configured to unevenly distribute an energy intensity at an irradiation surface by splitting, into a plurality of laser beams, a laser beam emitted from the laser light source and by overlaying a portion of the split plurality of laser beams at an irradiation position where the liquid is adhered.

Embodiments will now be illustrated with reference to the drawings. Similar components in the drawings are marked with the same reference numerals; and a detailed description is omitted as appropriate.

Figure 1:
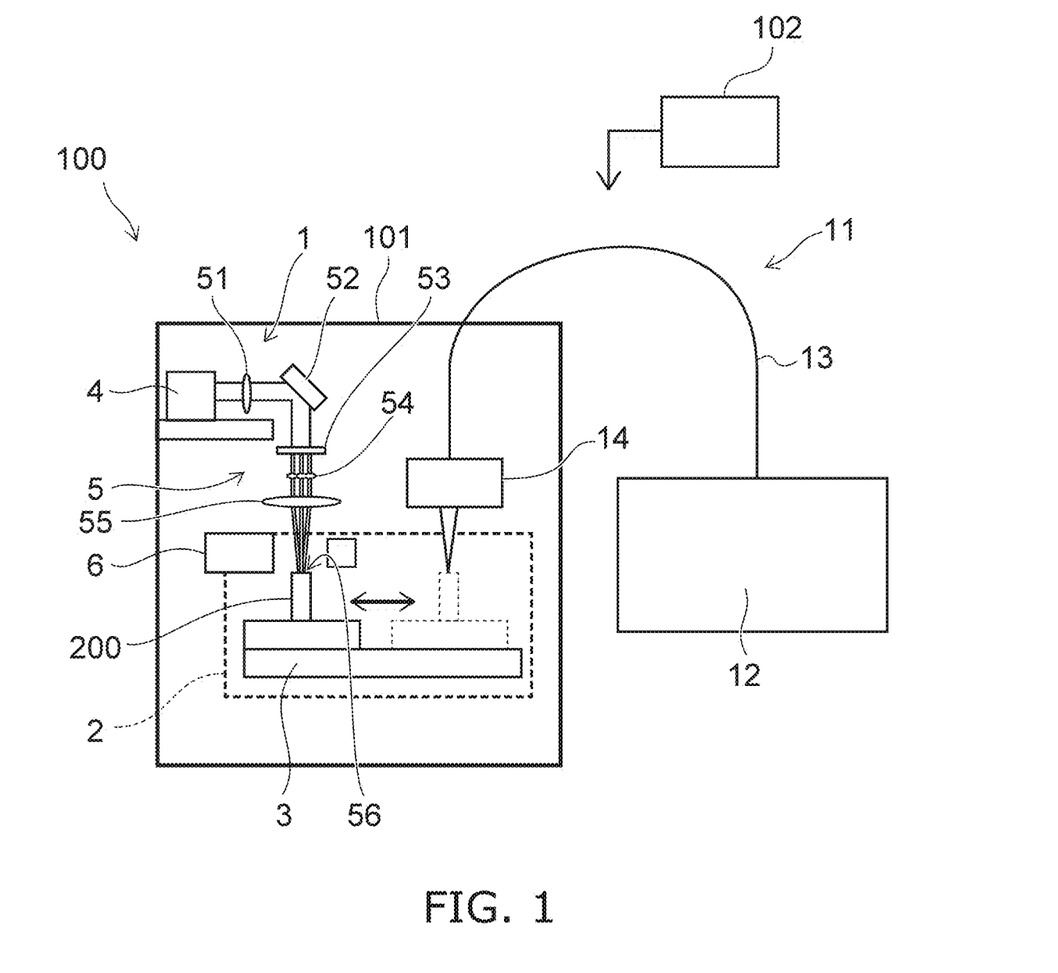
FIG. 1 is a schematic view illustrating a liquid removal apparatus 1 and a sealing system 100 according to the embodiment.

FIG. 1 is a schematic view illustrating a liquid removal apparatus 1 and a sealing system 100 according to the embodiment.

As shown in FIG. 1, the liquid removal apparatus 1, a sealing apparatus 11, a housing 101, and a controller 102 are provided in the sealing system 100.

The housing 101 has a box configuration. The housing 101 may be airtight so that penetration of dirt from the outside can be suppressed. The housing 101 is not always necessary and may be provided as necessary.

The controller 102 controls the operations of the liquid removal apparatus 1 and the sealing apparatus 11. The controller 102 may be, for example, a computer including a CPU (Central Processing Unit), memory, etc. The operations of the liquid removal apparatus 1 and the sealing apparatus 11 are controlled based on an operation program stored in the memory.

A receptacle 2, a movement part 3, a laser light source 4, an optical system 5, and a recovery part 6 are provided in the liquid removal apparatus 1.

The receptacle 2 is provided in the interior of the housing 101. The receptacle 2 has a box configuration. The receptacle 2 may be airtight so that the atmosphere of the interior is maintainable. For example, there is a risk that a gas may be produced when irradiating the laser beam on a liquid 201 adhered to the surface of a member 200. Also, there is a risk that a gas may be produced when the sealing apparatus 11 performs welding described below. By providing the receptacle 2, the diffusion of the produced gas to the surrounding environment can be suppressed. In such a case, a not-illustrated ventilation apparatus that suctions and processes the produced gas also may be provided in the receptacle 2.

A not-illustrated gas supply apparatus that purges the interior of the receptacle 2 also may be provided. The purge gas may be, for example, an inert gas such as nitrogen gas, etc. If the interior of the receptacle 2 is purged, alteration of the liquid 201 irradiated with the laser beam due to a chemical reaction can be suppressed. Therefore, an unclean surface of the member 200 and corrosion of the surface of the member 200 can be suppressed.

The movement part 3 is provided in the interior of the receptacle 2. The movement part 3 changes the position of the member 200. The movement part 3 moves the member 200 between the irradiation position of the laser beam from the liquid removal apparatus 1 and the irradiation position of the laser beam from the sealing apparatus 11. The movement part 3 may be, for example, an XY table, etc. A not-illustrated holding apparatus that holds the member 200 may be provided in the movement part 3. The not-illustrated holding apparatus may be, for example, an electrostatic chuck, a vacuum chuck, an electromagnetic chuck, a mechanical chuck, etc.

The laser light source 4 is provided in the interior of the housing 101. The laser light source 4 emits a laser beam having a prescribed wavelength. As described below, it is favorable for the laser beam to be irradiated on the interface between the liquid 201 and the surface of the member 200. Therefore, the laser beam is of a wavelength that is not easily absorbed by the liquid 201. The wavelength that is not easily absorbed by the liquid 201 depends on the components of the liquid 201, etc. Therefore, the wavelength of the laser beam may be appropriately determined by performing experiments, etc. For example, in the case where the liquid 201 is an electrolyte solution including a polymeric substance, etc., it is favorable for the wavelength of the laser beam to be about 0.5 μm to 1.06 μm. For example, a laser beam of such a wavelength can be irradiated by using a solid-state laser such as a YAG laser, etc.

There is a risk that the surface of the member 200 may be damaged if the energy of the irradiated laser beam is too large. Also, there is a risk that reactions between the components included in the liquid 201 and the components included in the member 200 or the surrounding environment may be promoted; the surface of the member 200 may become unclean; and the surface of the member 200 may be corroded. Therefore, it is favorable for the laser light source 4 to emit a pulse laser beam. In such a case, the pulse width may be about 6 nanoseconds; and the energy per pulse may be about 1 J (joule).

The optical system 5 is provided in the interior of the housing 101. The optical system 5 guides the laser beam emitted from the laser light source 4 to an irradiation position in the interior of the receptacle 2. In such a case, the laser beam is irradiated on the irradiation position in the interior of the receptacle 2 via a not-illustrated transmissive window provided in the receptacle 2.

The optical system 5 controls the energy intensity at an irradiation surface 56 to be unevenly distributed. Details relating to the control of the energy intensity are described below.

A collimating lens 51, a mirror 52, a mask 53, a lens array 54, and a condenser lens 55 are provided in the optical system 5.

The collimating lens 51 is provided between the laser light source 4 and the mirror 52. The collimating lens 51 causes the laser beam emitted from the laser light source 4 to be parallel light.

The mirror 52 reflects the laser beam that is incident and modifies the path of the laser beam. The mirror 52 is not always necessary and may be provided as necessary.

The mask 53 is provided on the laser beam emission side of the mirror 52. The mask 53 has multiple transmissive portions 53a and a light-shielding portion 53b. For example, the mask 53 may include the light-shielding portion 53b that has a plate configuration including a laser beam absorber, a light-shielding material such as a metal, etc., and the multiple transmissive portions 53a that are holes piercing the light-shielding portion 53b in the thickness direction. Or, the mask 53 may include a base that has a plate configuration including a transparent material such as glass, etc., the light-shielding portion 53b that covers the base and includes a laser beam absorber, a light-shielding material such as a metal, etc., and the multiple transmissive portions 53a that are openings provided in the light-shielding portion 53b.

The lens array 54 is provided on the laser beam emission side of the mask 53. Multiple lens elements 54a are provided in the lens array 54. For example, the number and arrangement of the lens elements 54a may be the same as the number and arrangement of the transmissive portions 53a.

The condenser lens 55 is provided on the laser beam emission side of the lens array 54.

The mask 53, the lens array 54, and the condenser lens 55 cooperate to control the irradiation positions of the laser beams to unevenly distribute the energy intensity at the irradiation surface 56. For example, the mask 53, the lens array 54, and the condenser lens 55 form, in the irradiation surface 56, a first region 56a where the energy intensity is high, and a second region 56b where the energy intensity is lower than that of the first region 56a.

In the embodiment, the mask 53, the lens array 54, and the condenser lens 55 are used as an energy controller 57. The energy controller 57 unevenly distributes the energy intensity at the irradiation surface 56 by splitting the laser beam emitted from the laser light source 4 into multiple laser beams and by overlaying a portion of the split multiple laser beams at the irradiation position where the liquid 201 is adhered.

Effects of the mask 53, the lens array 54, and the condenser lens 55 will now be described further.

Figure 2A:
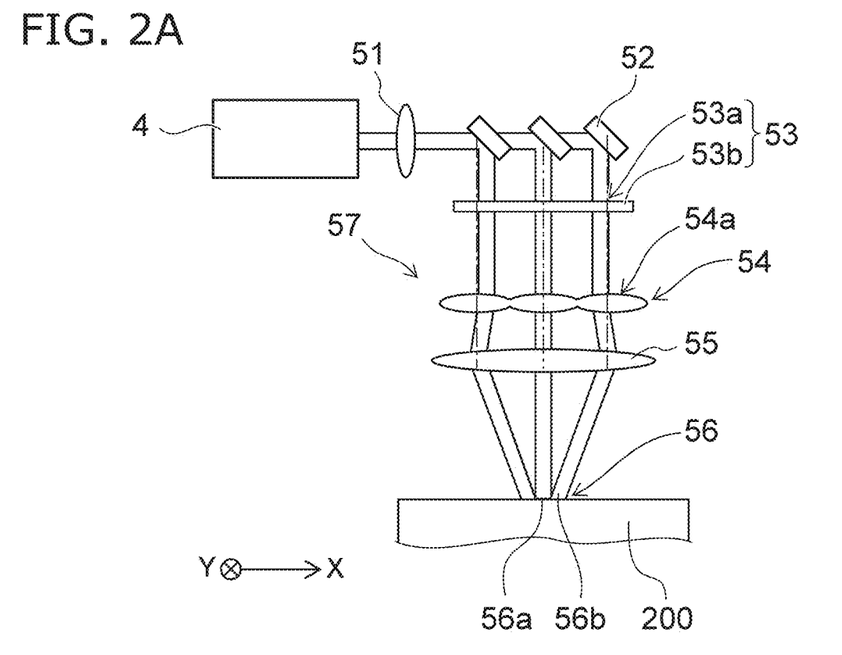
FIGS. 2A and 2B are schematic views illustrating the effects of the mask, the lens array, and the condenser lens.
Figure 2B:
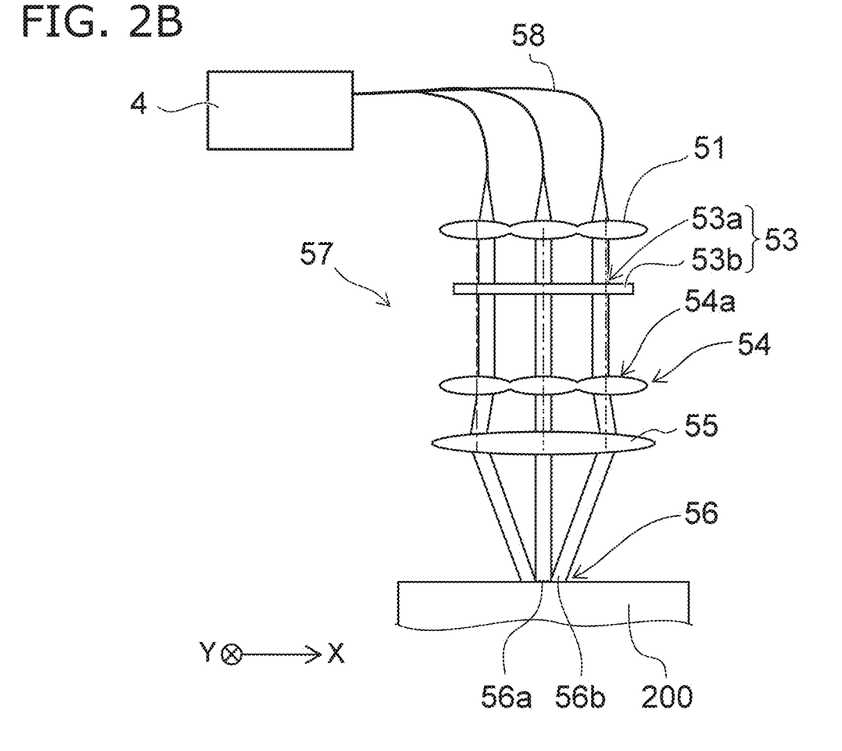

FIGS. 2A and 2B are schematic views illustrating the effects of the mask 53, the lens array 54, and the condenser lens 55. FIG. 2A is a case where the laser beam is guided to the mask 53 by using the multiple mirrors 52. FIG. 2B is a case where the laser beam is guided to the mask 53 by using multiple optical fibers 58.

Figure 3:
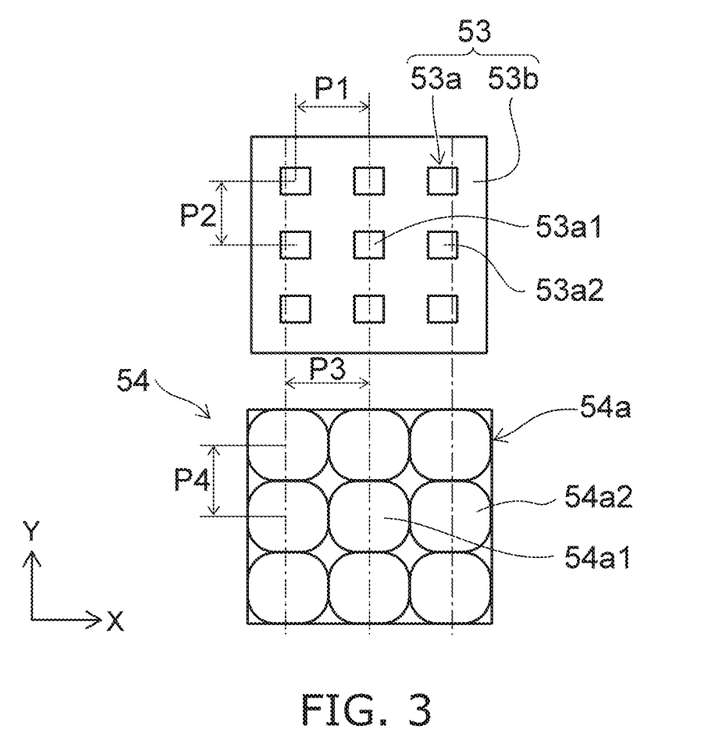
FIG. 3 is a schematic plan view illustrating a positional relationship between the transmissive portions and the lens elements.

FIG. 3 is a schematic plan view illustrating a positional relationship between the transmissive portions 53a and the lens elements 54a.

Arrows X and Y in FIGS. 2A and 2B and FIG. 3 illustrate mutually-orthogonal directions.

As shown in FIG. 3, the multiple transmissive portions 53a are arranged in the X-direction and the Y-direction. The multiple lens elements 54a are arranged in the X-direction and the Y-direction. In other words, the multiple transmissive portions 53a and the multiple lens elements 54a are arranged in matrix configurations.

In the X-direction, a pitch dimension P1 of the transmissive portions 53a is shorter than a pitch dimension P3 of the lens elements 54a. In the Y-direction, a pitch dimension P2 of the transmissive portions 53a is shorter than a pitch dimension P4 of the lens elements 54a. When viewed in plan (when viewed from the incident side of the laser beam), the center of a transmissive portion 53a1 at the center of the mask 53 overlaps the center of a lens element 54a1 at the center of the lens array 54. When viewed in plan, the center of a transmissive portion 53a2 at the periphery of the transmissive portion 53a1 is at a position shifted from the center of a lens element 54a2 at the periphery of the lens element 54a1.

As shown in FIGS. 2A and 2B, the laser beam that passes through the transmissive portion 53a1 at the center of the mask 53 passes through the lens element 54a1 at the center of the lens array 54 and is irradiated on the irradiation surface 56. Conversely, because the center of the transmissive portion 53a2 is at a position shifted from the center of the lens element 54a2, the laser beam that passes through the transmissive portion 53a2 and is incident on the lens element 54a2 is irradiated on a position shifted from the center of the lens element 54a2 when viewed in plan.

Thus, the irradiation positions of the laser beams passing through the multiple transmissive portions 53a can be changed by changing the positions of the multiple transmissive portions 53a. In other words, the irradiation positions of the laser beams at the irradiation surface 56 can be changed by changing the relative positional relationship between the pairs of the transmissive portion 53a and the lens element 54a.

Here, the mask 53, the lens array 54, and the condenser lens 55 are arranged to provide an imaging relationship between the focal position of the lens array 54 and the focal position of the condenser lens 55. Therefore, by changing the positions of the multiple transmissive portions 53a, the irradiation positions at the irradiation surface 56 of the laser beams passing through two or more transmissive portions 53a can be overlaid.

By overlaying the irradiation positions of the laser beams, the first region 56a where the energy intensity is high is formed in the irradiation surface 56. The region where the irradiation positions of the laser beams do not overlap is the second region 56b that has a lower energy intensity than the first region 56a.

Although a case is illustrated as an example in FIGS. 2A and 2B where the first region 56a is formed in the central region of the irradiation surface 56 and the second region 56b is formed in the peripheral edge region of the irradiation surface 56, this is not limited thereto.

As described above, the irradiation positions of the laser beams at the irradiation surface 56 can be changed by changing the relative positional relationships between the pairs of the transmissive portions 53a and the lens elements 54a. Therefore, the positions of the first region 56a and the second region 56b at the irradiation surface 56 can be modified appropriately.

Although a case is illustrated where the first region 56a and the second region 56b are formed, this is not limited thereto.

Multiple regions that have different energy intensities can be formed by changing the irradiation positions of the laser beams.

Figure 4A:
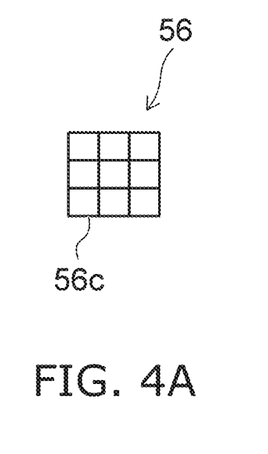
FIGS. 4A to 4C are schematic views illustrating cases where multiple regions having different energy intensities are formed.
Figure 4B:
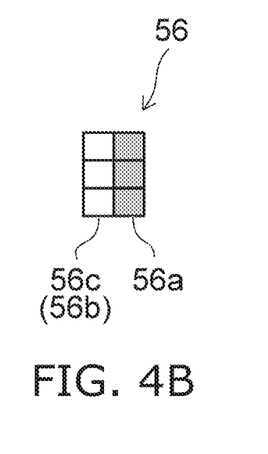
Figure 4C:
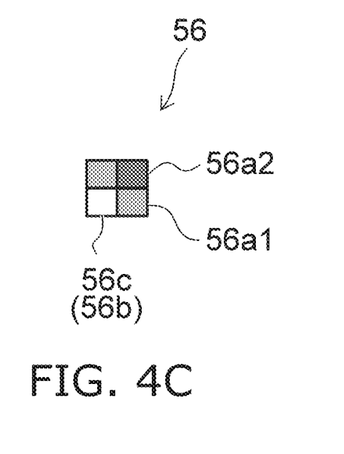

FIGS. 4A to 4C are schematic views illustrating cases where multiple regions having different energy intensities are formed.

For the description in FIGS. 4A to 4C, an irradiation region 56c of the laser beam irradiated via one lens element 54a is illustrated as a quadrilateral.

FIG. 4A is a case where the multiple irradiation regions 56c do not overlap. In such a case, the energy intensity at the irradiation surface 56 is substantially uniform.

FIGS. 4B and 4C are cases where a portion of the multiple irradiation regions 56c is overlaid.

As shown in FIG. 4B, if two irradiation regions 56c are overlaid, the energy intensity is substantially doubled. In such a case, the first region 56a is formed by overlaying two irradiation regions 56c. The portion where the irradiation regions 56c are not overlaid is the second region 56b.

Multiple types of regions having different energy intensities also can be formed by changing the number of the overlaid irradiation regions 56c.

For example, as shown in FIG. 4C, a region 56a1 can be formed by overlaying two irradiation regions 56c; and a region 56a2 can be formed by overlaying four irradiation regions 56c. The energy intensity in the region 56a1 is substantially 2 times the energy intensity in the irradiation region 56c. The energy intensity in the region 56a2 is substantially 4 times the energy intensity in the irradiation region 56c.

The arrangement, number, size, energy intensity, etc., of the regions also may be modified appropriately.

Effects will now be described for the case where multiple regions having different energy intensities are formed.

Figure 5A:
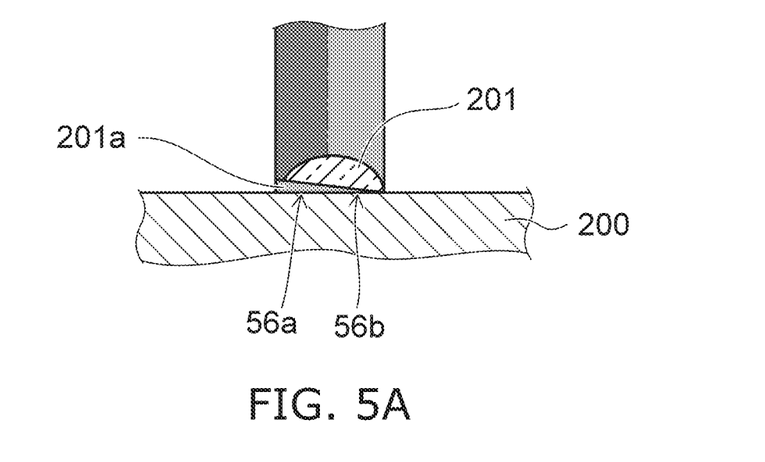
FIGS. 5A and 5B are schematic views illustrating the effects in the case where multiple regions having different energy intensities are formed.
Figure 5B:
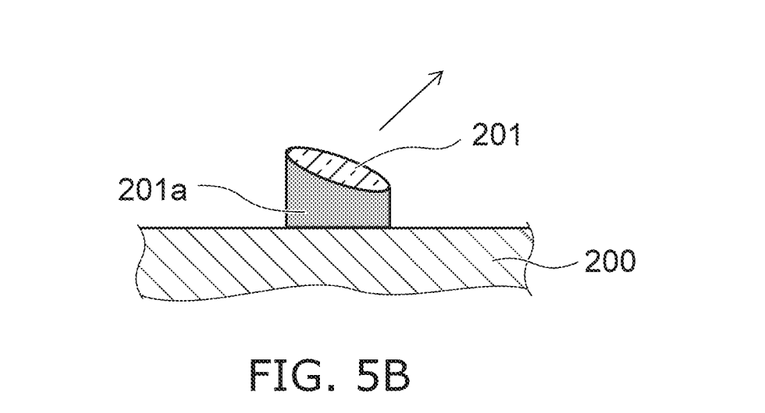

FIGS. 5A and 5B are schematic views illustrating the effects in the case where multiple regions having different energy intensities are formed.

As an example in FIGS. 5A and 5B, the liquid 201 that is adhered to the surface of the member 200 is a liquid droplet.

The first region 56a and the second region 56b having the lower energy intensity than the first region 56a are formed in the irradiation surface 56.

As shown in FIG. 5A, the surface of the member 200 is heated when the first region 56a and the second region 56b are formed in the irradiation surface 56; and a vapor layer 201a forms at the interface between the liquid 201 and the surface of the member 200.

Therefore, as shown in FIG. 5B, the liquid 201 is lifted up from the surface of the member 200 by the vapor layer 201a.

In such a case, the liquid 201 that is on the first region 56a lifts up first because the temperature of the first region 56a is higher than the temperature of the second region 56b. Therefore, the liquid 201 that has lifted up is exhausted easily in a direction away from the first region 56a. In other words, it is possible to control the exhaust direction of the liquid 201.

Here, in the case where the liquid 201 that is adhered to the surface of the member 200 is a liquid droplet, if there is a region of a portion of the liquid droplet where the laser beams are not irradiated, the portion of the liquid droplet may not be removed in the region not irradiated with the laser beams.

Therefore, in the case where the liquid 201 is the liquid droplet, it is favorable for the irradiation surface 56 to be formed to be larger than the planar dimension of the liquid droplet. In other words, when viewed in plan, it is favorable for the laser beams to be irradiated on the entire liquid droplet. If the laser beams are irradiated on the entire liquid droplet, the entire region of the interface between the liquid droplet and the surface of the member 200 can be heated; therefore, it is easy to form the vapor layer 201a in the entire region between the liquid droplet and the surface of the member 200. Therefore, it is easy to remove the entire liquid droplet.

In such a case, for example, the irradiation surface 56 that is larger than the planar dimension of the liquid droplet to be removed can be formed by modifying the number and size of the multiple transmissive portions 53a and the number and size of the lens elements 54a.

As shown in FIG. 1, the recovery part 6 is provided in the interior of the receptacle 2.

Figure 6:
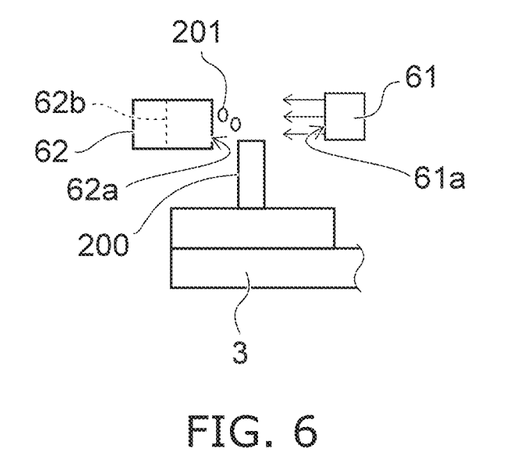
FIG. 6 is a schematic view illustrating the recovery part.

FIG. 6 is a schematic view illustrating the recovery part 6.

The recovery part 6 recovers the liquid 201 that has lifted up from the surface of the member 200 by the formation of the vapor layer 201a.

As shown in FIG. 6, a nozzle 61 and a suction part 62 are provided in the recovery part 6.

The nozzle 61 may be provided higher than the surface of the member 200 where the liquid 201 is adhered.

For example, the nozzle 61 forces, toward the suction part 62, a gas such as nitrogen gas or the like supplied from a not-illustrated gas cylinder, etc. Also, a switch valve that switches between supplying and stopping the gas may be included; a sensor that senses the lifted liquid 201 may be included; and the gas may be forced from the nozzle 61 when the lifting of the liquid 201 is sensed.

The suction part 62 may be provided higher than the surface of the member 200 where the liquid 201 is adhered. The suction part 62 may be provided on the side of the member 200 opposite to the side where the nozzle 61 is provided. A suction aperture 62a of the suction part 62 may oppose an outlet 61a of the nozzle 61.

As described above, because the exhaust direction of the liquid 201 can be controlled, it is favorable for the suction part 62 to be provided on the exhaust side of the liquid 201 and for the nozzle 61 to be provided on the opposite side of the exhaust side of the liquid 201. For example, the nozzle 61 may be provided on the side where the first region 56a is formed; and the suction part 62 may be provided on the side where the second region 56b is formed. Thus, the recovery efficiency of the liquid 201 can be increased.

A filter 62b such as a metal mesh, etc., also may be provided in the suction part 62. By providing the filter 62b, dirt and the like that is suctioned with the liquid 201 can be trapped.

A not-illustrated suction apparatus such as a vacuum blower, etc., also is connected to the suction part 62 via a pipe. For example, the suction apparatus may be provided outside the housing 101.

It is sufficient for at least one of the nozzle 61 or the suction part 62 to be provided. However, the scattering of the lifted liquid 201 can be suppressed by providing the nozzle 61 and the suction part 62.

Although the case is illustrated above where the liquid 201 is a liquid droplet, the liquid removal apparatus 1 is applicable even in the case where the liquid 201 is a liquid film having a planar dimension that is larger than that of the liquid droplet. In the case where the liquid 201 is a liquid film, it is sufficient to repeatedly remove the liquid 201 in liquid droplet configurations.

A not-illustrated image processor, etc., also may be provided in the liquid removal apparatus 1.

For example, the image processor senses the position of the liquid droplet adhered to the surface of the member 200 and/or the position of the end surface of the liquid film. Then, the liquid droplet, etc., can be moved to the position of the irradiation surface 56 by controlling the movement part 3 based on the position information of the liquid droplet, etc., sensed by the image processor.

Here, if the liquid 201 is evaporated completely by using continuous-wave laser beams, the laser beams that have large energies reach the surface of the member 200; and there is a risk that the laser beams that reach the surface of the member 200 may melt and damage the surface. In such a case, if the liquid 201 is evaporated completely by irradiating laser beams having small energies on the liquid 201, new problems occur in that the removal of the liquid 201 is insufficient, and the operation time is long.

Also, there is a risk that chemical reactions between the components included in the liquid 201 and the components included in the member 200 or the surrounding environment may be promoted; the surface of the member 200 may be polluted; and the surface of the member 200 may be corroded.

Conversely, the laser light source 4 emits pulse laser beams having small energies. The liquid 201 is not evaporated completely; and the vapor layer 201a is formed at the interface between the liquid 201 and the surface of the member 200. Therefore, the melting of the surface of the member 200, pollution of the surface of the member 200, and the corrosion of the surface of the member 200 can be suppressed.

In other words, according to the liquid removal apparatus 1, the effects on the surface of the member 200 can be suppressed when removing the liquid 201.

The optical system 5 controls the energy intensity at the irradiation surface 56 to be unevenly distributed. In other words, the energy controller 57 (the mask 53, the lens array 54, and the condenser lens 55) form multiple regions having different energy intensities by overlaying a portion of the irradiation positions of the laser beams. Therefore, the recovery efficiency of the liquid 201 can be increased because it is possible to control the exhaust direction of the liquid 201.

The sealing apparatus 11 seals, by welding, a hole in the surface of the member 200 such as a liquid inlet of the liquid 201, etc.

As shown in FIG. 1, a laser light source 12, an optical system 13, and an irradiation head 14 are provided in the sealing apparatus 11.

The laser light source 12 may be provided outside the housing 101. The laser light source 12 emits a laser beam of a prescribed wavelength.

Here, because the pulse laser beam is a laser beam that is temporally discontinuous, the pulse energy is temporally discontinuous; and the fusion time is short. There are also cases where a portion of the multiple laser pulses has a small energy. Therefore, there is a risk that welding defects such as splashing, blow holes, etc., may occur in the weld mark (the weld bead) when welding using the pulse laser beam. Also, there is a risk that the productivity may decrease when welding using the pulse laser beam because it is difficult to increase the welding speed.

Conversely, if the welding is performed using a continuous-wave laser beam, the molten pool can be moved continuously because the fusion time can be relatively long. Therefore, the weld mark is substantially not affected even if there is some amount of power fluctuation or fluctuation of the absorptance of the laser beam due to the surface state of the member 200. Therefore, if the welding is performed using the continuous-wave laser beam, an exceedingly stable welding joint can be obtained because the appropriate weld mark can be formed even in the case where external disturbances occur. If the welding is performed using the continuous-wave laser beam, the productivity can be increased because it is easy to increase the welding speed.

Therefore, it is favorable for the laser light source 12 to emit a continuous-wave laser beam.

In such a case, the laser light source 12 may be, for example, a solid-state laser that can generate continuous output in the several-kW class. The laser light source 12 may be, for example, a fiber laser, a disk laser, etc.

One end of the optical system 13 is connected to the laser light source 12; and the other end of the optical system 13 is connected to the irradiation head 14. The optical system 13 guides, to the irradiation head 14, the laser beam emitted from the laser light source 12. The optical system 13 may be, for example, an optical fiber, etc.

The irradiation head 14 is provided in the interior of the receptacle 2. The irradiation head 14 emits, toward the weld portion of the member 200, the laser beam that is incident via the optical system 13. Also, the irradiation head 14 may be able to scan the irradiation position of the laser beam. In such a case, the irradiation head 14 may include, for example, a galvanometer scanner.

Figure 7:
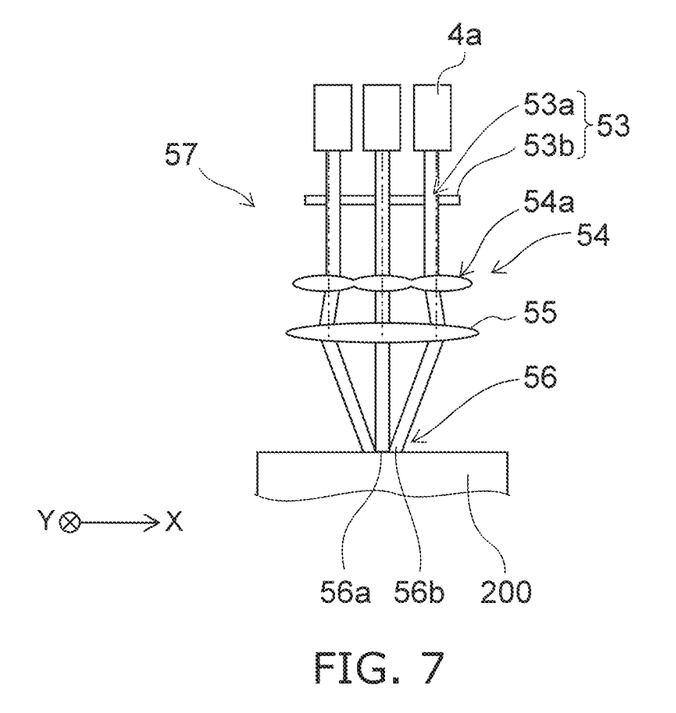
FIG. 7 is a schematic view illustrating a laser light source according to another embodiment.

FIG. 7 is a schematic view illustrating a laser light source 4a according to another embodiment.

As described above, it is favorable for the energy per pulse of the pulse laser beam to be about 1 J (joule). However, there are many cases where the energy per pulse of the pulse laser beam emitted from a general laser light source is about 20 mJ (millijoules) to 100 mJ (millijoules). In such cases, as shown in FIG. 7, it is sufficient to provide the multiple laser light sources 4a and to emit the laser beams substantially simultaneously from the multiple laser light sources 4a.

Although the mask 53 may be omitted in the case where the multiple laser light sources 4a are provided, the positional precision of the laser beam incident on the lens array 54 can be increased by providing the mask 53.

In the embodiment, the energy controller 57 unevenly distributes the energy intensity at the irradiation surface 56 by overlaying, at the irradiation position where the liquid 201 is adhered, a portion of the multiple laser beams emitted from the multiple laser light sources 4a.

Effects of the sealing system 100 will now be illustrated; and a liquid removal method and a method for manufacturing the member 200 in which the liquid 201 is stored will now be illustrated.

Figure 8A:
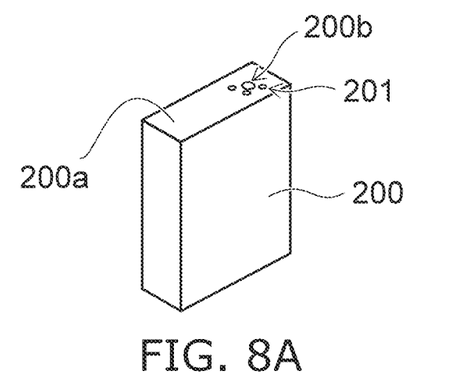
FIGS. 8A to 8C are schematic views illustrating the method for manufacturing the member in which the liquid is stored.
Figure 8B:
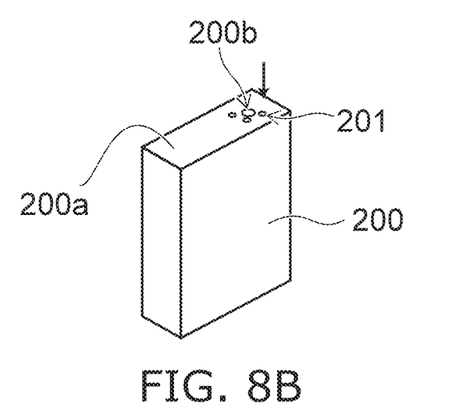
Figure 8C:
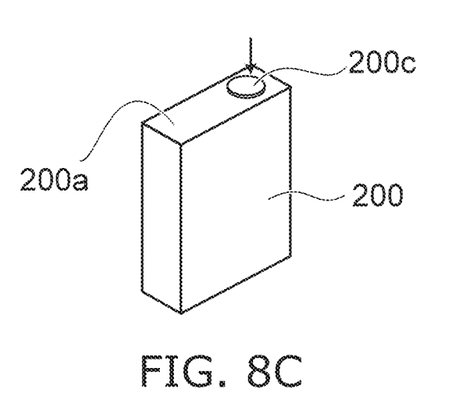

FIGS. 8A to 8C are schematic views illustrating the method for manufacturing the member 200 in which the liquid 201 is stored.

As shown in FIGS. 8A to 8C, the member 200 may be a container containing the liquid 201 in the interior. The material of the member 200 is not particularly limited; and it is sufficient to have the necessary strength and to be resistant to the liquid 201.

An inlet 200b is provided in an upper end surface 200a of the member 200.

First, the liquid 201 is poured into the interior of the member 200 via the inlet 200b. The liquid 201 may be, for example, water, a chemical liquid, an oil such as a lubrication oil or the like, an electrolyte solution, a drink, etc. The type of the liquid 201 is not limited to those illustrated.

Here, there are cases where liquid leaks from the nozzle used in the pouring, or gas that is produced in the interior of the member 200 causes the liquid 201 to leak out from the inlet 200b.

In such cases, as shown in FIG. 8A, the liquid 201 may adhere to the periphery of the inlet 200b. If the liquid 201 adheres to the periphery of the inlet 200b, there is a risk that it may be difficult to seal the inlet 200b by the welding.

Therefore, next, as shown in FIG. 8B, the liquid 201 that is adhered to the periphery of the inlet 200b is removed.

The movement part 3 moves the member 200 so that the liquid 201 is at the position of the irradiation surface 56.

Continuing, the laser light source 4 or 4a emits the pulse laser beam. The energy controller 57 (the mask 53, the lens array 54, and the condenser lens 55) forms the multiple regions having different energy intensities by overlaying a portion of the irradiation positions of the pulse laser beams. The vapor layer 201a forms at the interface between the liquid 201 and the upper end surface 200a at the irradiation surface 56 because the upper end surface 200a of the member 200 is heated. By forming the vapor layer 201a, the liquid 201 is lifted up from the upper end surface 200a. Also, the exhaust direction of the liquid 201 is controlled because the multiple regions having different energy intensities are formed.

The liquid 201 that has lifted up from the upper end surface 200a is recovered by the recovery part 6.

Then, the inlet 200b is sealed as shown in FIG. 8C. In such a case, a plate 200c may cover the inlet 200b; and the peripheral edge of the plate 200c may be welded. The plate 200c may be caused to cover the inlet 200b by using a not-illustrated transfer apparatus.

If the inlet 200b is small, the inlet 200b may be sealed by melting the periphery of the inlet 200b.

The movement part 3 moves the member 200 so that the inlet 200b is at the position of the irradiation surface.

Continuing, the laser light source 12 emits a continuous-wave laser beam. The continuous-wave laser beam is incident on the irradiation head 14 via the optical system 13; and the irradiation head 14 emits the incident continuous-wave laser beam toward the peripheral edge of the plate 200c. At this time, the entire perimeter of the plate 200c is welded by the irradiation position of the continuous-wave laser beam being scanned using a galvanometer scanner provided in the irradiation head 14.

Thus, the member 200 in which the liquid 201 is stored can be manufactured.

As described above, the liquid removal method according to the embodiment includes a process of unevenly distributing the energy intensity at the irradiation surface 56 by splitting the laser beam into multiple laser beams and by overlaying a portion of the split multiple laser beams at the irradiation position where the liquid 201 is adhered.

Or, a process of unevenly distributing the energy intensity at the irradiation surface is included by overlaying, at the irradiation position where the liquid 201 is adhered, a portion of multiple laser beams emitted from the multiple laser light sources 4a.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A liquid removal apparatus configured to remove a liquid by irradiating a laser beam on the liquid, the liquid being adhered to a surface of a member, the apparatus comprising:
   a laser light source; and
   an energy controller configured to unevenly distribute an energy intensity at an irradiation surface by splitting, into a plurality of laser beams, a laser beam emitted from the laser light source and by overlaying and irradiating a portion of the split plurality of laser beams at the same time at an irradiation position where the liquid is adhered,
   the energy controller including:
      a mask having a plurality of transmissive portions;
      a lens array having a plurality of lens elements and being provided on a laser beam emission side of the mask;
   in plan view, a center of at least one of the plurality of transmissive portions being at a position shifted from a center of a corresponding lens element.

2. The apparatus according to claim 1, wherein the energy controller further includes:
   a condenser lens provided on a laser beam emission side of the lens array.

3. The apparatus according to claim 1, further comprising a recovery part configured to recover the liquid lifted up from the surface of the member.

4. The apparatus according to claim 3, wherein the recovery part includes:
   a nozzle; and
   a suction part, the suction part opposing an outlet of the nozzle.

5. The apparatus according to claim 1, wherein the laser light source is configured to emit a pulse laser beam.

6. The apparatus according to claim 1, wherein the laser beam is irradiatable on an interface between the liquid and the surface of the member at the irradiation position.

7. The apparatus according to claim 1, wherein the number of the plurality of lens elements are the same as the number of the plurality of transmissive portions.

8. A liquid removal apparatus configured to remove a liquid by irradiating a laser beam on the liquid, the liquid being adhered to a surface of a member, the apparatus comprising:
   a plurality of laser light sources; and
   an energy controller configured to unevenly distribute an energy intensity at an irradiation surface by overlaying and irradiating a portion of a plurality of laser beams at the same time at an irradiation position where the liquid is adhered, the plurality of laser beams being emitted from the plurality of laser light sources,
   the energy controller including:
      a mask having a plurality of transmissive portions;
      a lens array having a plurality of lens elements and being provided on a laser beam emission side of the mask;
   in plan view, a center of at least one of the plurality of transmissive portions being at a position shifted from a center of a corresponding lens element.

9. The apparatus according to claim 8, wherein
the energy controller further includes:
   a condenser lens provided on a laser beam emission side of the lens array.

10. The apparatus according to claim 9, wherein the number of the plurality of lens elements are the same as the number of the plurality of transmissive portions.

11. The apparatus according to claim 8, further comprising a recovery part configured to recover the liquid lifted up from the surface of the member.

12. The apparatus according to claim 11, wherein
the recovery part includes:
   a nozzle; and
   a suction part opposing an outlet of the nozzle.

13. The apparatus according to claim 8, wherein the laser light source is configured to emit a pulse laser beam.

14. The apparatus according to claim 8, wherein the laser beam is irradiatable on an interface between the liquid and the surface of the member at the irradiation position.

15. A liquid removal method removing a liquid by irradiating a laser beam on the liquid, the liquid being adhered to a surface of a member, the method comprising:
   unevenly distributing an energy intensity at an irradiation surface by splitting the laser beam into a plurality of laser beams and by overlaying and irradiating a portion of the split plurality of laser beams at the same time at an irradiation position where the liquid is adhered,
   the unevenly distributing an energy intensity performed by an energy controller,
   the energy controller including:
      a mask having a plurality of transmissive portions;
      a lens array having a plurality of lens elements and being provided on a laser beam emission side of the mask;
   in plan view, a center of at least one of the plurality of transmissive portions being at a position shifted from a center of a corresponding lens element.

16. The method according to claim 15, wherein a vapor layer forms at an interface between the liquid and the surface of the member in the uneven distributing of the energy intensity.

17. The method according to claim 16, wherein a region of the liquid where the energy intensity is high lifts up before a region of the liquid where the energy intensity is low when the vapor layer forms.

18. A liquid removal method removing a liquid by irradiating a laser beam on the liquid, the liquid being adhered to a surface of a member, the method comprising:
   unevenly distributing an energy intensity at an irradiation surface by overlaying and irradiating a portion of a plurality of laser beams at the same time at an irradiation position where the liquid is adhered, the plurality of laser beams being emitted from the plurality of laser light sources,
   the unevenly distributing an energy intensity performed by an energy controller,
   the energy controller including:
      a mask having a plurality of transmissive portions;
      a lens array having a plurality of lens elements and being provided on a laser beam emission side of the mask;
   in plan view, a center of at least one of the plurality of transmissive portions being at a position shifted from a center of a corresponding lens element.

19. The method according to claim 18, wherein a vapor layer forms at an interface between the liquid and the surface of the member in the uneven distributing of the energy intensity.

20. The method according to claim 19, wherein a region of the liquid where the energy intensity is high lifts up before a region of the liquid where the energy intensity is low when the vapor layer forms.

* * * * *